United States Patent [19]

Hansen

[11] Patent Number: 5,525,009

[45] Date of Patent: Jun. 11, 1996

[54] SYNTHETIC BULK MATERIAL COVER AND METHOD OF USING THE SAME

[75] Inventor: David L. Hansen, Averill Park, N.Y.

[73] Assignee: Landfill Service Corporation, Apalachin, N.Y.

[21] Appl. No.: 384,584

[22] Filed: Jan. 23, 1995

Related U.S. Application Data

[63] Continuation-in-part of Ser. No. 203,948, Feb. 28, 1994, Pat. No. 5,385,429, which is a continuation of Ser. No. 81,566, Jun. 23, 1993, which is a continuation-in-part of Ser. No. 966,269, Oct. 26, 1992, Pat. No. 5,275,508, which is a continuation-in-part of Ser. No. 674,864, Mar. 25, 1991, Pat. No. 5,161,915.

[51] Int. Cl.$^6$ .................................................... B09B 1/00
[52] U.S. Cl. ..................... 405/129; 405/128; 405/264; 405/266; 588/252; 106/698; 106/709
[58] Field of Search ........................ 405/128, 129, 405/150.2, 52, 263, 266, 267, 268, 270, 264; 588/252, 249; 47/9; 106/706, 718, 901, 707, 710, 698, 697, 609; 404/76, 75

[56] References Cited

U.S. PATENT DOCUMENTS

| | | | |
|---|---|---|---|
| 1,869,265 | 7/1932 | Leriche et al. | 405/150.2 X |
| 4,133,928 | 1/1979 | Riley et al. | 52/659 X |
| 4,678,376 | 7/1987 | Gavin et al. | 405/270 |
| 4,908,129 | 3/1990 | Finsterwalder et al. | 405/267 X |
| 5,054,406 | 10/1991 | Judd | 405/129 X |
| 5,090,154 | 2/1992 | Jacob | 405/270 X |

FOREIGN PATENT DOCUMENTS

| | | | |
|---|---|---|---|
| 3303938 | 8/1984 | Germany | 405/150.2 |
| 0139381 | 7/1985 | Japan | 405/129 |
| 0823589 | 4/1981 | U.S.S.R. | 405/150.2 |
| 1067219 | 1/1984 | U.S.S.R. | 405/150.2 |

*Primary Examiner*—Dennis L. Taylor
*Attorney, Agent, or Firm*—Heslin & Rothenberg

[57] ABSTRACT

A synthetic cover for bulk material piles and loads in transit may be formed from a mixture of liquid, binder, and fibers. These constituents may be mixed and applied to cover a waste pile. The cover will harden to minimize water infiltration, wind blown dust, odor and affinity to birds, flies and other insects. The liquid may include water; the binder may include portland cement, portland cement with flyash, cement kiln dust with or without bentonite, or stone dust. The fibers may comprise shredded paper or wood or plastic fibers.

28 Claims, No Drawings

SYNTHETIC BULK MATERIAL COVER AND METHOD OF USING THE SAME

CROSS-REFERENCE TO RELATED APPLICATIONS

This application is a continuation-in-part of U.S. patent application Ser. No. 203,948 filed on Feb. 28, 1994 now U.S. Pat. No. 5,385,429, which is a continuation of U.S. patent application Ser. No. 081,566 filed on Jun. 23, 1993, which is a continuation-in-part of U.S. patent application Ser. No. 966,269 filed on Oct. 26, 1992, now issued as U.S. Pat. No. 5,275,508, which is a continuation-in-part of U.S. patent application Ser. No. 674,864 filed on Mar. 25, 1991 now issued as U.S. Pat. No. 5,161,915.

BACKGROUND OF THE INVENTION

This invention relates to the field of bulk material management. More particularly, the invention relates to a synthetic cover for bulk piles including loads in transit such coal piles, coal rail car loads, cement clinker piles, fertilizer piles.

During shipping, processing or storage, bulk materials may be concentrated into a particular area or a site. When concentrated into piles, it is often necessary to cover such piles to minimize or prevent blowing dust, water damage, odor, prevent fires, prevent the movement or erosion of the material, and prevent vectors such as birds, flies, and other insects from feeding thereon. Typically, bulk material is covered by spreading a synthetic material such as a tarp or foam over the exposed portions of the pile. For example, in power plants, piles of coal may be covered by spreading an elastomeric geomembrane thereon. The thickness and construction of the membrane depends upon the length of time the pile is to remain covered and the climatic conditions expected.

One problem associated with the use of membrane covers is the high labor cost and worker safety concerns associated with physical placement of such membranes.

Besides synthetic membranes, certain chemical foam products have been developed and used to cover bulk piles. However, these products are relatively expensive and very difficult to apply. Also, the safety of these chemical formulations has been questioned and their effect upon ground water quality remains unknown.

It is therefore an object of the present invention to provide a cover for bulk piles which is inexpensive to apply and poses no safety risk to attendant personnel.

It is also an object of the present invention to provide a cover for bulk piles which is derived from readily available, preferably recycled, materials.

It is also an object of the present invention to provide a cover for bulk material piles which causes no harm or threat to the environment.

It is also an object of the present invention to provide a cover for bulk piles which is easily applied.

SUMMARY OF THE INVENTION

The aforementioned objects are achieved by utilizing the synthetic cover for bulk piles in accordance with the present invention.

The invention includes a mixture for creating a synthetic cover for bulk piles. The mixture comprises a liquid, a binder, and fibers. The invention also incorporates a method of making a synthetic cover for bulk piles comprising mixing fibers with a liquid to form a pre-mixture, and mixing a binder reagent to form a final mixture, wherein the final mixture has a thick-viscous consistency which will harden after it is applied to cover bulk piles.

The mixture may comprise approximately thirty percent to sixty percent by weight liquid, approximately forty percent to seventy percent by weight binder, approximately up to ten percent by weight fibers.

The liquid may comprise water, landfill leachate, and/or industrial waste water. The binder may comprise portland cement, cement kiln dust (with an optional portion of portland cement); and/or cement kiln dust with bentonite. The amount of bentonite may be up to twenty percent, by weight of the total mixture. Also, the binder may comprise fly ash, and/or fly ash with portland cement. The amount of portland cement may comprise about five to twenty five percent of the mixture, by weight. The fibers may include cellulose such as shredded paper and/or finely shredded wood fibers. The fibers may also comprise plastic fibers such as polyethylene terephthalate fibers.

The invention also incorporates a method of covering bulk piles comprising mixing a binder, fibers, and liquid together to form a mixture; coating a bulk pile with the mixture; and allowing the coating to harden as a cover on the bulk pile. The mixing of the binder, fibers and liquid may comprise mixing fibers into a liquid, and thereafter, adding the binder thereto and mixing the binder therein. Mixing the fibers, liquid and binder may occur within a mixing tank. The coating of a bulk material pile with the mixture may comprise spraying the mixture on the bulk material pile.

DETAILED DESCRIPTION OF THE PREFERRED EMBODIMENTS

Reference is hereby made to U.S. patent application Ser. No. 203,948 filed on Feb. 28, 1994 directed to a Synthetic Cover for Waste; U.S. patent application No. 081,566 filed on Jun. 23, 1993 directed to a Synthetic Cover for Waste Piles Applicator and Method of Using the Same; U.S. Pat. No. 5,275,508 directed to a Synthetic Cover for Waste; and U.S. Pat. No. 5,161,915 directed to a Synthetic Cover for Waste Piles. U.S. patent application Ser. Nos. 203,948; 081,566 and U.S. Pat. Nos. 5,275,508 and 5,161,915 are hereby incorporated by reference and made a part of the disclosure herein.

The synthetic cover for bulk piles in accordance with the present invention may be used to cover a variety of bulk piles such as, for example, coal piles, cement product piles, fertilizer piles, soil piles and contaminated material piles. However, implementation of the synthetic cover for bulk piles will be described in conjunction with its use to coal piles and rail car loads of coal.

Since bulk material piles are relatively large, it is necessary to cover a large area of the surface of these piles using the synthetic cover in accordance with the present invention. Accordingly, it is necessary to provide an apparatus which is capable of applying the synthetic cover to a large area and providing a system which is capable of generating and applying large volumes of the material used to form the synthetic cover. It has been found that commercial equipment available from Landfill Service Corporation of Apalachin, New York may be used to mix and apply the ingredients ("constituents") necessary to produce the synthetic cover in accordance with the present invention. Such equipment is described in U.S. patent application Ser. No. 081,566 filed on Jun. 23, 1993.

The synthetic cover for bulk piles in accordance with the present invention is mixed by filling a mixing tank with a predetermined amount of liquid constituent such as water, landfill leachate, or industrial waste water. The proper amount of fibers are then loaded into the mixer containing the liquid. Optionally, a coloring agent such as an "Earthtone" mortar dye available from Landfill Service Corporation may be added if desired. The agitator is activated such that the are mixed with the liquid. Typically, it is necessary to activate the agitator for approximately a minute or longer to adequately mix the liquid and fibers together. The binder reagent is then placed into the mixer where it is thoroughly agitated with the liquid, and fibers.

The mixing time necessary to yield a mixture with the proper consistency may vary depending upon the percentage of each constituent added to the mixture. Also, weather conditions such as temperature and humidity may affect the length of time that the binder must be mixed with the liquid, and fibers. However, the materials should be mixed until the mixture has a thick, viscid, "milk shake" type consistency.

When the mixture is properly agitated, a spray applicator is moved to the working area and the mixture is sprayed onto the bulk material pile surface using a motion similar to spray painting. The mixture is sprayed in such a manner that a uniform layer approximately one-eighth to one-quarter of an inch thick exists. After the entire surface area of the waste pile has been sprayed in this manner, the material will harden if undisturbed. When the mixture is applied at the proper consistency it will resemble a clotty coagulant type of material which will adhere to the bulk material pile and cohere to itself. Typically, the material will dry and harden to resemble a stucco-type finish within 24 hours. After the entire bulk material pile has been covered, the applicator and mixing unit must be cleaned out thoroughly when not in use so that the mixture remaining within the apparatus does not harden. Typically, water will suffice in cleaning the apparatus.

The liquid portion of the mixture may include water, landfill leachate, and/or industrial waste water. Any quality of water is acceptable for use in the present invention, including turbid, polluted and/or non-potable waters as well as landfill leachate and industrial waste water. The amount of liquid should be between 30 and 60 percent, by weight, of the total mixture. The binder used in the mixture may include portland cement, cement kiln dust with an optional portion of portland cement, fly ash with portland cement, stone dust with portland cement, and/or cement kiln dust with bentonite. The amount of binder in the total mixture should be between 40 and 70 percent, by weight. The cellulose fiber may include shredded newspaper, shredded mixed paper, and/or finely shredded wood fiber. The total amount of the cellulose fiber in the mixture should be between ½ and 10 percent, by weight. The plastic fiber which may be used within the mixture includes polyethylene terephthalate (PET) fibers or other plastic fibers including recycled plastics. The amount of plastic fiber used is in the mixture may be up to two percent, or less, of the mixture by weight.

The exact percentage of each constituent, (i.e., liquid, binder, cellulose fibers, plastic fibers) used to create the mixture may depend upon the weather conditions which exist during mixing and application of the synthetic cover and upon the particular type of bulk material being covered. For example, at relatively higher temperatures, the amount of liquid used in the total mixture will be higher than the amount of liquid used at lower temperatures. However, the total amount of water used within the mixture should be between 30 and 60 percent despite such weather variations. Also, if there is a high degree of rainfall which will contact the mixture, then the amount of water used should be decreased accordingly.

The amount of binder used in the mixture will also be higher on a cold day compared to the amount of binder used in the mixture on a hot day. However, despite variations in rainfall and temperature, the amount of binder should remain between 40 and 70 percent of the total weight of the mixture. The amount of cellulose fiber used is also dependent upon rainfall. On a day where the rainfall is present, the amount of cellulose fiber should be relatively higher than the amount used on a dry day. Accordingly, the higher the rainfall, the higher the amount of cellulose fiber used. The amount of plastic fiber used in the mixture is not dependent upon changes in weather conditions.

The constituent used in liquid portion of the mixture may include water, landfill leachate, and/or industrial waste water. Although either of these three types of liquids will suffice, water is the preferred liquid constituent because it is easily available. Many different qualities of water may be used including turbid, polluted and non-potable water. Industrial waste water may also be used. These waste waters may be effective as a liquid constituent provided that they do not contain pollutants which react with other constituents during mixing. Landfill leachate, created by percolation of water through the buried refuse at a landfill, may also be used as a liquid constituent. Since disposal and treatment of landfill leachate are troublesome and expensive, use of landfill leachate may provide an effective method of its disposal. It should be noted that use of landfill leachate and industrial waste water as the liquid constituent may require increased safety precautions.

The constituents which may be used as cellulose fibers include shredded newspaper, mixed types of shredded paper and/or shredded wood fiber. These cellulose fiber constituents may be used separately or in various combinations. Preferably, shredded newspaper or shredded mixed waste paper should be used because of its absorbability and availability. Newspapers may be shredded into particles, preferably less than one-half inch in any dimension. In order to ensure proper liquid content in the total mixture, the shredded newspaper should not have more than a 6 percent, by weight, moisture content prior to mixing with the liquid constituent. Also, other finely shredded mixed papers useable as the cellulose fiber constituent should preferably be less than one-half inch in any dimension. These mixed paper fibers may include shredded magazines, phone books, corrugated containers, junk mail, office paper, etc. These shredded mixed papers should also be less than 6 percent by weight moisture content prior to mixing. Shredded wood fibers may also be used as a constituent provided that the wood fibers are finely shredded. The shredded wood fiber must be in a string or hair-like shape such as fine excelsior. Wood chips are not satisfactory for use as the cellulose fiber constituent.

The constituents which may be used as plastic fibers include high density polyethylene, polyvinyl chloride as well as or other types of plastics shredded into thin hair-like fibers. These hair-like fibers should be between one-quarter to one-half inch in length. Polyethylene terephthalate fibers, such as PETROFLEX® type 401 fiber which are hair-like in diameter and between one-quarter to one-half inch long in length are preferred as the plastic constituent useable in the present invention. These fibers are manufactured from recycled products such as plastic soda containers.

The constituents which may be used as binders in the present invention include Portland cement, cement kiln dust (CKD), fly ash, bentonite, or stone dust, or any combination of these. Flyash with portland cement is the preferred binder used in the present invention. Flyash is captured during the combustion process by air pollution control devices. The amount of portland cement used with the fly ash should be approximately 5 to 25 percent by weight of the total mixture. In lieu of fly ash, stone dust, derived from commercial stone crushing operations, may be used along with portland cement as a binder constituent. Accordingly, the amount of portland cement used with stone dust should also be between 5 to 25 percent by weight of the total mixture. Although flyash with portland cement dust is the preferred binder constituent, other mineral binders may be used. Also, bentonite may be added to any of the other binders to form the binder constituent. The bentonite enhances the smoothness and consistency of the mixture and also increases its tackiness and viscosity enabling it to better adhere to waste and cohere to itself. Typically, up to approximately twenty percent, by weight of the total mixture, of bentonite may be added. However, it is usually not necessary or required to add bentonite with the flyash with portland cement as the binder constituent unless impermeability is desired.

Using the aforementioned materials as constituents will result in a mixture which may be applied, by spraying or another manner, to a bulk material pile and allowed to harden, typically within 24 hours, to form a cover. The cover will minimize water infiltration, wind blown dust, blowing of the bulk material during transport, odor and prevent vectors such as birds, flies and other insects from feeding off the waste. The bulk materials may include coal, cements, fertilizers as well as other materials. This cover may be applied prior to transport of the bulk materials in open containers such as open railway cars.

Test Results

TEST 1

A laboratory test was conducted utilizing the constituents and parameters shown in the following table.

| Constituent | Type | %age of Mixture by Weight | Weight |
|---|---|---|---|
| Liquid | Water | 33.2 | 447 gm |
| Binder | Flyash | 60.3 | 813 gm |
|  | Portland Cement | 6.0 | 81.3 gm |
| Fiber | LSC P-100 | 0.5 | 6 gm |
|  |  | (100) | (1347.3) |

These amounts of constituents were mixed as discussed supra. The mixture was then applied as a cover on a small sample of crushed coal. The mixture was of a viscosity which properly adhered to the sample coal.

TEST 2

A field test was conducted utilizing the constituents and parameters shown in the following table.

| Constituent | Type | %age of Mixture by Weight | Weight |
|---|---|---|---|
| Liquid | Water | 29 | 4482 lbs |
| Binder | Flyash | 63 | 9800 lbs |
|  | Portland Cement | 7.9 | 1222 lbs |
| Fiber | LSC P-100 | 0.1 | 20 lbs |
|  |  | (100) | (15,524) |

The constituent amounts were mixed as discussed supra and the mixture was sprayed onto power utility coal pile. The mixture hardened into a cover which withstood freezing temperatures and various weather conditions.

Although the invention has been disclosed in relation to the embodiments described herein, it is apparent that various modifications, substitutions equivalents and other changes may be utilized without departing in any way from the spirit of the invention. Any such modifications are intended to be within the scope of the invention as defined by the following claims.

What is claimed is:

1. A bulk material cover comprising the following constituents:

approximately thirty percent to sixty percent, by weight, liquid;

approximately forty percent to seventy percent, by weight, mineral binder;

up to approximately ten percent, by weight, fibers; and wherein a mixture of the constituents forms a thick viscid slurry for application in a uniform layer of approximately a quarter of an inch to form said bulk material cover.

2. The bulk material cover according to claim 1 wherein the liquid comprises water.

3. The bulk material cover according to claim 2 wherein the water comprises landfill leachate.

4. The bulk material cover according to claim 3 wherein the binder comprises flyash and Portland cement.

5. The bulk material cover according to claim 3 wherein the binder comprises bentonite.

6. The bulk material cover according to claim 5 wherein the amount of Bentonite in the mixture comprises approximately one to twenty percent, by weight.

7. The bulk material cover according to claim 1 or 2 wherein the binder comprises cement kiln dust.

8. The bulk material cover according to claim 7 wherein the binder further comprises portland cement.

9. The bulk material cover according to claim 8 wherein the amount of portland cement is approximately five to twenty five percent, by weight.

10. The bulk material cover according to claim 1 wherein the binder comprises stone dust.

11. The bulk material cover according to claim 1 wherein the fibers comprise shredded paper.

12. The bulk material cover according to claim 1 wherein the fibers comprise finely shredded wood fibers.

13. The bulk material cover according to claim 1 wherein the fibers comprises polyethylene terephthalate fibers.

14. A method of covering bulk material comprising:

mixing fibers sufficient to prevent erosion with a liquid to form a pre-mixture;

mixing a binder reagent with the pre-mixture to form a final mixture, wherein the final mixture forms a thick viscid slurry; and applying the final mixture to the bulk material in a uniform layer of approximately a quarter of an inch to form a hardened or interim cover.

15. The method of covering bulk material according to claim 14 wherein the final mixture comprises:

about thirty to sixty percent, by weight, liquid;

about forty to seventy percent, by weight, binder; and up to about ten percent fibers.

16. The method of covering bulk material according to claim 15 wherein the fibers are mixed with the liquid in a mixing tank.

17. The method of covering bulk material according to claim 15 wherein the liquid comprises water.

18. The method of covering bulk material according to claim 15 wherein the fibers comprise shredded paper.

19. The method of covering bulk material according to claim 18 wherein the fibers further comprise plastic fibers.

20. The method of covering bulk material according to claim 15 wherein the binder comprises flyash and portland cement.

21. The method of covering bulk material according to claim 19 wherein the binder comprises Bentonite.

22. The method of covering bulk material according to claim 15 wherein the binder comprises portland cement.

23. The method of making a covering bulk material according to claim 22 wherein the binder further comprises cement kiln dust or stone dust.

24. The method of covering bulk material according to claim 15, wherein the step of applying comprises applying said final mixture to a bulk material pile, the method further comprising allowing said final mixture to harden into a cover.

25. The method of covering bulk material of claim 24 further comprising transporting said bulk material in an open container.

26. A bulk material cover comprising the following constituents:

up to approximately forty five percent, by weight, liquid;

a plurality, by weight, of a binder;

a minority portion of cellulose fibers and plastic fibers sufficient to prevent erosion; and wherein a mixture of the constituents forms a thick viscid slurry for spraying in a uniform layer of approximately a quarter of an inch to form said bulk material cover.

27. A method of covering a bulk material pile comprising:

mixing cellulose fibers and plastic fibers sufficient to prevent erosion with a liquid to form a pre-mixture; and mixing a binder reagent with the pre-mixture to form a final mixture, wherein the final mixture forms a thick viscid slurry for spraying in a uniform layer of approximately a quarter of an inch to cover the bulk material pile.

28. A method of covering a bulk material pile comprising:

mixing a binder, cellulose fibers and plastic fibers sufficient to prevent erosion, and liquid together to form a mixture of a thick viscid slurry for spraying in a uniform layer of approximately a quarter of an inch to form a daily interim cover;

coating the bulk material pile with the mixture; and allowing the coating of the mixture to harden as a cover on the bulk material pile.

* * * * *